(12) United States Patent
Kadomatsu

(10) Patent No.: US 7,596,590 B1
(45) Date of Patent: Sep. 29, 2009

(54) IMAGE COMMUNICATION APPARATUS AND METHOD

(75) Inventor: Daiki Kadomatsu, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 09/597,146

(22) Filed: Jun. 20, 2000

(30) Foreign Application Priority Data

Jun. 30, 1999 (JP) ................................. 11-186882

(51) Int. Cl.
*G06F 15/16* (2006.01)

(52) U.S. Cl. ........................................ 709/201; 709/206

(58) Field of Classification Search ................. 709/201, 709/238, 246, 247, 206; 358/400, 468, 452, 358/1.9, 1.15; 382/232, 242
See application file for complete search history.

(56) References Cited

U.S. PATENT DOCUMENTS

| | | | | |
|---|---|---|---|---|
| 4,135,214 A | * | 1/1979 | Weber | 382/245 |
| 5,227,893 A | * | 7/1993 | Ett | 358/400 |
| 5,349,448 A | * | 9/1994 | Hirai | 358/444 |
| 5,379,070 A | * | 1/1995 | Retter et al. | 375/240.2 |
| 5,392,133 A | * | 2/1995 | Nakajima | 358/407 |
| 5,414,780 A | * | 5/1995 | Carnahan | 382/276 |
| 5,594,554 A | * | 1/1997 | Farkash et al. | 382/244 |
| 5,659,726 A | * | 8/1997 | Sandford et al. | 707/101 |
| 5,684,865 A | * | 11/1997 | Mohtashemi et al. | 379/100.17 |
| 5,692,048 A | * | 11/1997 | Gormish et al. | 380/246 |
| 5,699,170 A | * | 12/1997 | Yokose et al. | 358/426.07 |
| 5,751,449 A | * | 5/1998 | Nobuta | 358/498 |
| 5,757,379 A | * | 5/1998 | Saito | 345/645 |
| 5,765,176 A | * | 6/1998 | Bloomberg | 715/514 |
| 5,799,138 A | * | 8/1998 | Yoshida | 358/1.15 |
| 5,818,970 A | * | 10/1998 | Ishikawa et al. | 382/248 |
| 5,917,615 A | * | 6/1999 | Reifman et al. | 358/468 |
| 5,956,162 A | * | 9/1999 | Nobuta | 358/500 |
| 5,991,050 A | * | 11/1999 | Mathur et al. | 358/400 |
| 6,072,599 A | * | 6/2000 | Oba et al. | 358/444 |
| 6,104,500 A | * | 8/2000 | Alam et al. | 358/1.15 |
| 6,160,640 A | * | 12/2000 | Ohmori | 358/474 |
| 6,208,427 B1 | * | 3/2001 | Lee | 358/1.15 |
| 6,219,454 B1 | * | 4/2001 | Kawano et al. | 382/232 |
| 6,229,620 B1 | * | 5/2001 | Makitani et al. | 358/1.15 |
| 6,288,800 B1 | * | 9/2001 | Izumi | 358/468 |
| 6,324,573 B1 | * | 11/2001 | Rhoads | 709/217 |

(Continued)

FOREIGN PATENT DOCUMENTS

JP 08-079477 3/1996

(Continued)

*Primary Examiner*—Quang N. Nguyen
*Assistant Examiner*—Kristie D Shingles
(74) *Attorney, Agent, or Firm*—Fitzpatrick, Cella, Harper & Scinto

(57) ABSTRACT

Disclosed are a color facsimile apparatus and method in which when transmission information is added onto an image and then transmitted with the image, memory can be conserved and transmit processing shortened. A color image is read and image data represented the read image is generated. The image is then compressed in the form of "JPEG" and stored in memory. In the transmission of the image data that has been stored in memory, transmission information is added onto the image data before the image data is subjected to JPEG compression. When the image data is transmitted, therefore, processing for expanding the image and then recompressing the data can be eliminated.

5 Claims, 8 Drawing Sheets

U.S. PATENT DOCUMENTS

| | | | |
|---|---|---|---|
| 6,405,244 B1 * | 6/2002 | Bando et al. | 709/206 |
| 6,407,828 B1 * | 6/2002 | Medina | 358/462 |
| 6,424,996 B1 * | 7/2002 | Killcommons et al. | 709/206 |
| 6,425,001 B2 * | 7/2002 | Lo et al. | 709/217 |
| 6,426,809 B1 * | 7/2002 | Hayashi et al. | 358/529 |
| 6,437,881 B1 * | 8/2002 | Baba et al. | 358/434 |
| 6,441,913 B1 * | 8/2002 | Anabuki et al. | 358/1.12 |
| 6,456,664 B1 * | 9/2002 | Matsumura et al. | 375/240.27 |
| 6,493,105 B1 * | 12/2002 | Onuma | 358/1.15 |
| 6,512,593 B1 * | 1/2003 | Yashiki | 358/1.15 |
| 6,570,667 B1 * | 5/2003 | Hattori et al. | 358/1.15 |
| 6,618,491 B1 * | 9/2003 | Abe | 382/107 |
| 6,618,749 B1 * | 9/2003 | Saito et al. | 709/207 |
| 6,628,411 B2 * | 9/2003 | Miller et al. | 358/1.1 |
| 6,671,063 B1 * | 12/2003 | Iida | 358/1.15 |
| 6,728,412 B1 * | 4/2004 | Vasylyev | 382/242 |
| 6,806,973 B1 * | 10/2004 | Muto et al. | 358/1.13 |
| 6,972,858 B1 * | 12/2005 | Nishida et al. | 358/1.15 |
| 7,369,270 B1 * | 5/2008 | Silverbrook et al. | 358/1.9 |

FOREIGN PATENT DOCUMENTS

JP   10-013600   1/1998

* cited by examiner

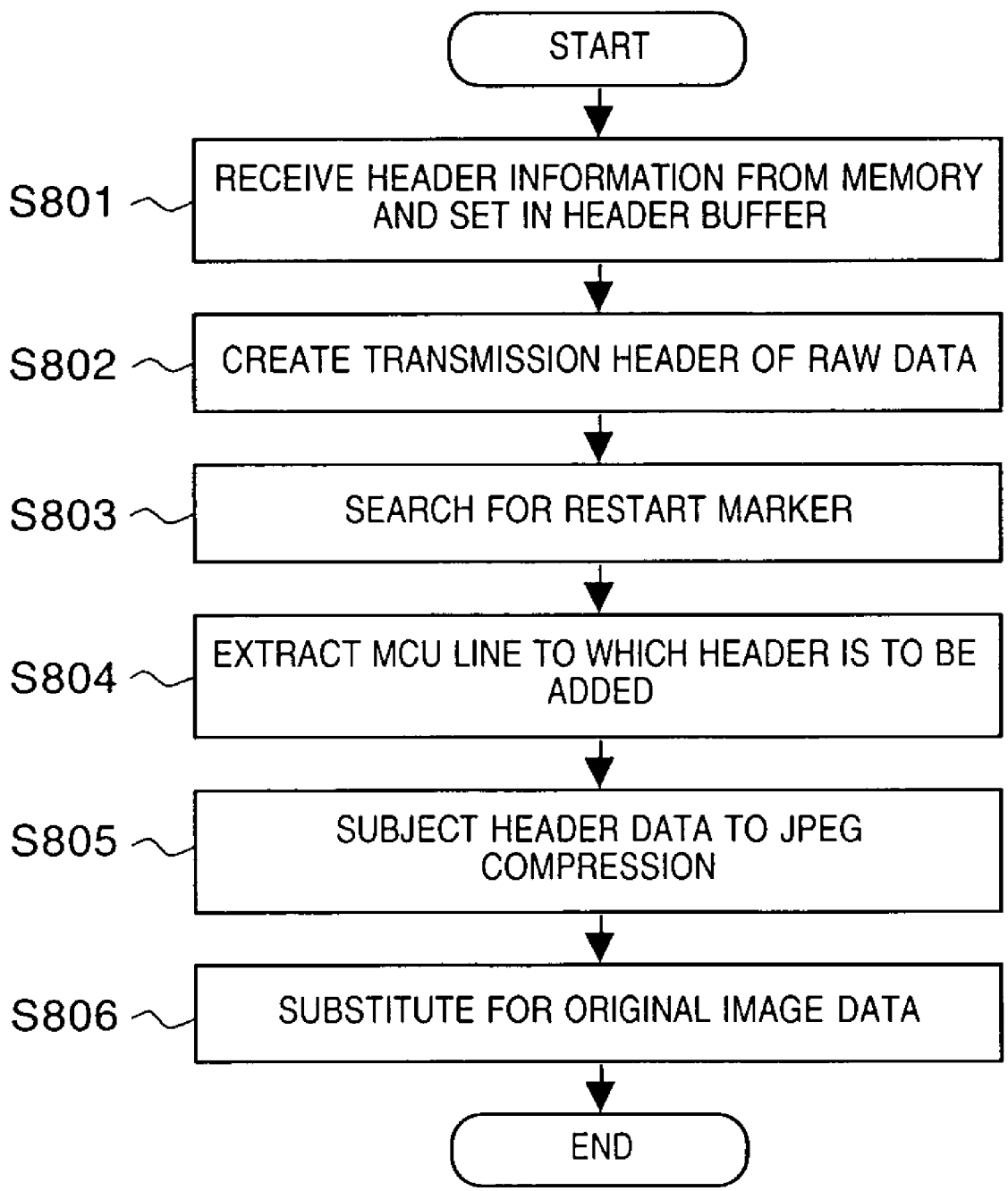

IMAGE COMMUNICATION APPARATUS AND METHOD

FIELD OF THE INVENTION

This invention relates to an image communication apparatus such as a facsimile apparatus, and to an image communication method.

BACKGROUND OF THE INVENTION

In transmission of an image by a facsimile machine, transmission information such as the date and time and number of pages is added onto the transmitted image as a header or footer in order that the receiving side may readily confirm the sender of the image and the number of pages in the transmission.

In a facsimile machine of the type which stores transmitted data in memory in the form of raw data and transmits the data after it is compressed, a very large memory is required when raw image data is stored. In conventional facsimile machines of this type, therefore, the raw data is stored in memory after it has been compressed. In a case where the aforementioned transmission information is added onto this data, however, use is made of a procedure in which the data that has been stored in memory is expanded and restored to raw data at the time of transmission, data relating to the transmission information is added onto this raw data, the resulting data is then compressed again and transmitted after compression.

Since this procedure involves data compression and expansion at the time of transmission, processing takes time. This problem becomes particularly acute when dealing with a large amount of data.

For example, ITU-T Recommendation T.81 recommends using the JPEG standard as the scheme for encoding a color image. If transmission information is added onto a color image, therefore, the conventional technique requires a procedure involving expanding data that has undergone JPEG compression, adding on a transmission header and then performing compression again. However, color image data involves much more data as compared with monochrome image data and compression/expansion of this data takes too much time. This conventional technique is not very practical for this reason.

SUMMARY OF THE INVENTION

Accordingly, an object of the present invention is to provide an image communication apparatus and method in which when transmission information is added onto an image and then transmitted with the image, memory can be conserved and transmit processing shortened.

According to the present invention, the foregoing object is attained by providing an image communication apparatus comprising: means for reading an image and generating image data representing the image; means for adding transmission information onto the image data; means for compressing the image data onto which the transmission information has been added and storing the compressed image data in memory; and means for transmitting the image data that has been stored in the memory.

According to the present invention, the foregoing object is attained by providing an image communication apparatus comprising: means for adding transmission information onto image data that has been entered; means for compressing the image data onto which the transmission information has been added and storing the compressed image data in memory; and means for transmitting the image data that has been stored in the memory.

According to the present invention, the foregoing object is attained by providing an image communication apparatus comprising: means for reading an image and successively storing image data representing the image in a buffer; means for extracting the image data from the buffer in prescribed area units of the image; means for determining whether transmission information is to be added onto each item of image data extracted; means for adding the transmission information onto the image data that has been determined to have this information added to it; means for compressing the image data in the area units and storing the compressed image data in memory; and means for transmitting the image data that has been stored in the memory.

According to the present invention, the foregoing object is attained by providing an image communication apparatus comprising: means for reading an image and generating image data representing the image; means for adding transmission information onto the image data; means for compressing the image data onto which the transmission information has been added and preserving the compressed image data; and means for transmitting the image data that has been preserved.

According to the present invention, the foregoing object is attained by providing an image communication apparatus comprising: means for reading an image and generating image data representing the image; means for adding transmission information onto the image data; means for compressing the image data onto which the transmission information has been added and storing the compressed image data in memory; and means for transmitting the image data that has been stored in the memory without expanding or compressing the image data.

According to the present invention, the foregoing object is attained by providing an image communication method comprising the steps of: adding transmission information onto image data representing an image that has been read; compressing the image data onto which the transmission information has been added and storing the compressed image data in memory; and transmitting the image data that has been stored in the memory.

According to the present invention, the foregoing object is attained by providing an image communication method comprising the steps of: adding transmission information onto image data that has been entered; compressing the image data onto which the transmission information has been added and storing the compressed image data in memory; and transmitting the image data that has been stored in the memory.

According to the present invention, the foregoing object is attained by providing an image communication method having a reading step of reading an image and generating image data representing the image; a storage step of compressing the image data and storing the compressed image data in the memory; and a transmitting step of transmitting the image data that has been stored in memory; the method further including a step of adding transmission information onto the image data after the reading step and before the storage step.

According to the present invention, the foregoing object is attained by providing an image communication method comprising the steps of: reading an image and successively storing image data representing the image in a buffer; extracting the image data from the buffer in prescribed area units of the image; determining whether transmission information is to be added onto each item of image data extracted; adding the transmission information onto the image data that has been determined to have this information added to it; compressing the image data in the area units and storing the compressed image data in memory; and transmitting the image data that has been stored in the memory.

According to the present invention, the foregoing object is attained by providing an image communication method comprising the steps of: adding transmission information onto image data representing an image that has been read; compressing the image data onto which the transmission information has been added and preserving the compressed image data; and transmitting the image data that has been preserved.

According to the present invention, the foregoing object is attained by providing an image communication method comprising the step of: adding transmission information onto image data representing an image that has been read; compressing the image data onto which the transmission information has been added and storing the compressed image data in memory; and transmitting the image data that has been stored in the memory without expanding or compressing the image data.

According to the present invention, the foregoing object is attained by providing a storage medium storing a program for causing a computer to function as the following means in an image communication apparatus in order to transmit image data: means for adding transmission information onto the image data; means for compressing the image data onto which the transmission information has been added and storing the compressed image data in memory; and means for transmitting the image data that has been stored in the memory.

According to the present invention, the foregoing object is attained by providing a storage medium storing a program for causing a computer to function as the following means in an image communication apparatus in order to transmit image data that has been entered: means for adding transmission information onto the image data; means for compressing the image data onto which the transmission information has been added and storing the compressed image data in memory; and means for transmitting the image data that has been stored in the memory.

According to the present invention, the foregoing object is attained by providing a storage medium storing a program for causing a computer to function as the following means in an image communication apparatus, which has means for reading an image and successively storing image data representing the image in a buffer, in order to transmit the image data: means for extracting the image data from the buffer in prescribed area units of the image; means for determining whether transmission information is to be added onto each item of image data extracted; means for adding the transmission information onto the image data that has been determined to have this information added to it; means for compressing the image data in the area units and storing the compressed image data in memory; and means for transmitting the image data that has been stored in memory.

According to the present invention, the foregoing object is attained by providing a storage medium storing a program for causing a computer to function as the following means in order to transmit image data that has been entered: means for adding transmission information onto the image data; means for compressing the image data onto which the transmission information has been added and preserving the compressed image data; and means for transmitting the image data that has been preserved.

According to the present invention, the foregoing object is attained by providing a storage medium storing a program for causing a computer to function as the following means in order to transmit image data that has been entered: means for adding transmission information onto the image data; means for compressing the image data onto which the transmission information has been added and storing the compressed image data in memory; and means for transmitting the image data that has been stored in the memory without expanding or compressing the image data.

According to the present invention, the foregoing object is attained by providing an image communication apparatus comprising: means for reading an image and generating image data representing the image; means for compressing the image data and adding on a marker that is for adding on transmission information; means for storing the compressed image data in memory; and means for detecting the marker from the image data that has been stored in memory, replacing, on the basis of a position at which the marker resides, some of the image data with data relating to transmission information, this data having been compressed according to a compression format identical with that of the image data, and transmitting this image data.

According to the present invention, the foregoing object is attained by providing an image communication apparatus comprising: means for compressing image data that has been entered and adding on a marker that is for adding on transmission information; means for storing the compressed image data in memory; and means for detecting the marker from the image data that has been stored in memory and replacing, on the basis of a position at which the marker resides, some of the image data with data relating to transmission information.

According to the present invention, the foregoing object is attained by providing an image communication apparatus comprising: means for reading an image and successively storing image data representing the image in a buffer; means for extracting the image data from the buffer in prescribed area units of the image; means for compressing each item of image data that has been extracted and adding on a marker that is for adding on transmission information; means for storing the compressed image data in memory; and means for detecting the marker from the image data that has been stored in memory and replacing, on the basis of a position at which the marker resides, some of the image data with data relating to transmission information.

According to the present invention, the foregoing object is attained by providing an image communication apparatus comprising: means for reading an image and generating image data representing the image; means for compressing the image data and adding on a marker that is for adding on transmission information; means for preserving the compressed image data; and means for detecting the marker from the preserved image data and replacing, on the basis of a position at which the marker resides, some of the image data with data relating to transmission information.

According to the present invention, the foregoing object is attained by providing an image communication apparatus comprising: means for reading an image and generating image data representing the image; means for compressing the image data and adding on a marker that is for adding on transmission information; means for storing the compressed image data in memory; and means for detecting the marker from the image data that has been stored in memory, replacing, on the basis of a position at which the marker resides, some of the image data with data relating to transmission information, and transmitting this image data without expanding or compressing it.

According to the present invention, the foregoing object is attained by providing an image communication method comprising the steps of: compressing image data that has been read and adding on a marker that is for adding on transmission information; storing the compressed image data in memory; and detecting the marker from the image data that has been stored in memory, and replacing, on the basis of a position at which the marker resides, some of the image data with data relating to transmission information.

According to the present invention, the foregoing object is attained by providing an image communication method comprising the steps of: compressing image data that has been entered and adding on a marker that is for adding on transmission information; storing the compressed image data in memory; and detecting the marker from the image data that has been stored in memory, and replacing, on the basis of a position at which the marker resides, some of the image data with data relating to transmission information.

According to the present invention, the foregoing object is attained by providing an image communication method comprising the steps of: reading an image and successively storing image data representing the image in a buffer; extracting the image data from the buffer in prescribed area units of the image; compressing each item of image data that has been extracted and adding on a marker that is for adding on transmission information; storing the compressed image data in memory; and detecting the marker from the image data that has been stored in memory and replacing, on the basis of a position at which the marker resides, some of the image data with data relating to transmission information.

According to the present invention, the foregoing object is attained by providing an image communication method comprising the steps of: compressing image data that has been read and adding on a marker that is for adding on transmission information; preserving the compressed image data; and detecting the marker from the preserved image data and replacing, on the basis of a position at which the marker resides, some of the image data with data relating to transmission information.

According to the present invention, the foregoing object is attained by providing an image communication method comprising the steps of: compressing image data that has been read and adding on a marker that is for adding on transmission information; storing the compressed image data in memory; and detecting the marker from the image data that has been stored in memory, replacing, on the basis of a position at which the marker resides, some of the image data with data relating to transmission information, and transmitting this image data without expanding or compressing it.

According to the present invention, the foregoing object is attained by providing a storage medium storing a program for causing a computer to function as the following means in an image communication apparatus in order to transmit image data: means for compressing the image data and adding on a marker that is for adding on transmission information; means for storing the compressed image data in memory; and means for detecting the marker from the image data that has been stored in memory, and replacing, on the basis of a position at which the marker resides, some of the image data with data relating to transmission information.

According to the present invention, the foregoing object is attained by providing a storage medium storing a program for causing a computer to function as the following means in an image communication apparatus in order to transmit image data that has been entered: means for compressing image data that has been entered and adding on a marker that is for adding on transmission information; means for storing the compressed image data in memory; and means for detecting the marker from the image data that has been stored in memory and replacing, on the basis of a position at which the marker resides, some of the image data with data relating to transmission information.

According to the present invention, the foregoing object is attained by providing a storage medium storing a program for causing a computer to function as the following means in an image communication apparatus, which has means for reading an image and successively storing image data representing the image in a buffer, in order to transmit the image data: means for extracting the image data from the buffer in prescribed area units of the image; means for compressing each item of image data that has been extracted and adding on a marker that is for adding on transmission information; means for storing the compressed image data in memory; and means for detecting the marker from the image data that has been stored in memory and replacing, on the basis of a position at which the marker resides, some of the image data with data relating to transmission information.

According to the present invention, the foregoing object is attained by providing a storage medium storing a program for causing a computer to function as the following means in an image communication apparatus in order to transmit image data that has been entered: means for compressing the image data and adding on a marker that is for adding on transmission information; means for preserving the compressed image data; and means for detecting the marker from the preserved image data and replacing, on the basis of a position at which the marker resides, some of the image data with data relating to transmission information.

According to the present invention, the foregoing object is attained by providing a storage medium storing a program for causing a computer to function as the following means in an image communication apparatus in order to transmit image data: means for compressing the image data and adding on a marker that is for adding on transmission information; means for storing the compressed image data in memory; and means for detecting the marker from the image data that has been stored in the memory, replacing, on the basis of a position at which the marker resides, some of the image data with data relating to transmission information, and transmitting this image data without expanding or compressing it.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart of processing according to the second technique.

DESCRIPTION OF THE PREFERRED EMBODIMENTS

Preferred embodiments of the present invention will now be described in detail in accordance with the accompanying drawings.

Figure 1:
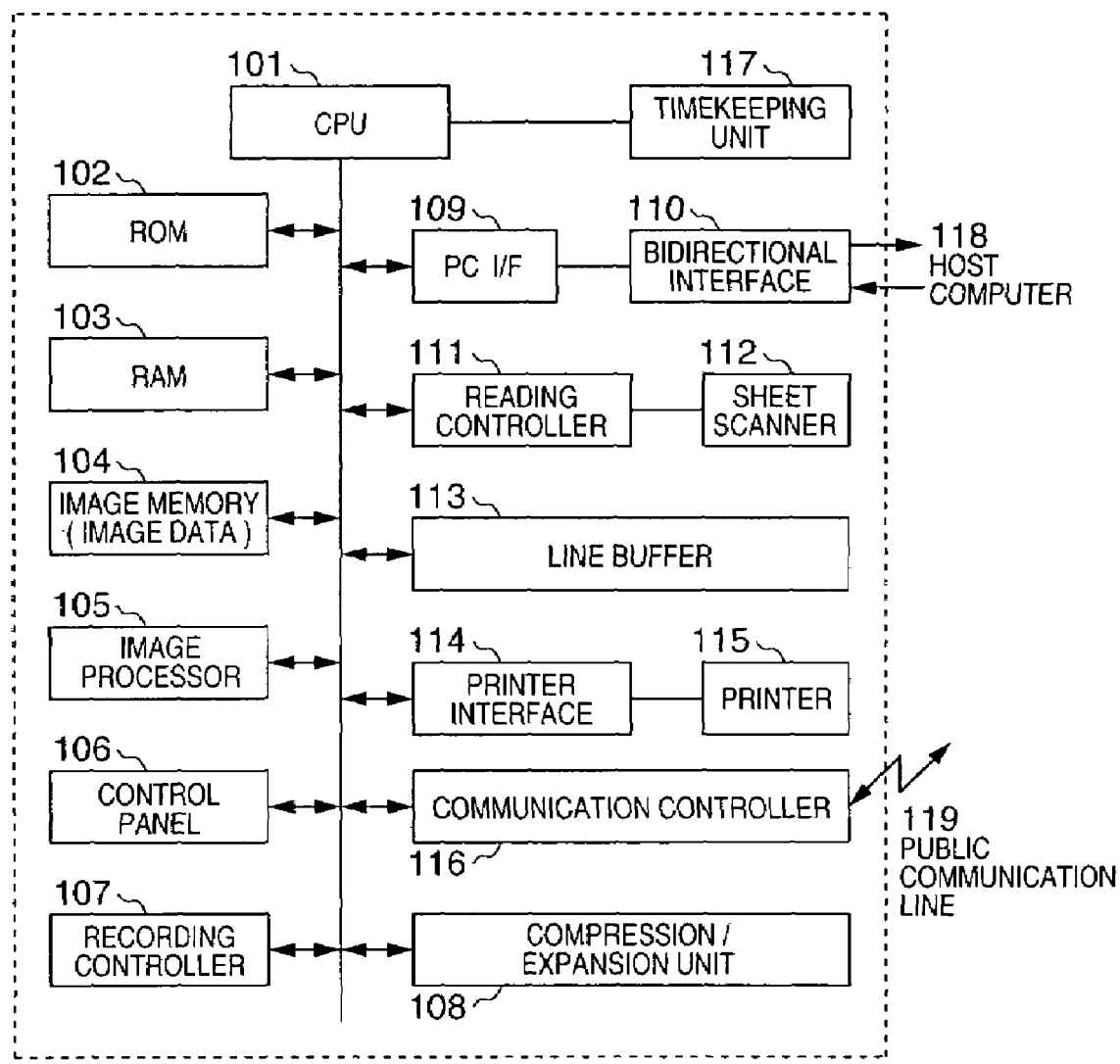
FIG. 1 is a block diagram showing the overall construction of a facsimile machine according to an embodiment of the present invention.

FIG. 1 is a block diagram showing the overall construction of a facsimile machine serving as an image communication apparatus according to an embodiment of the present invention. This facsimile machine has a G3 facsimile function, is used upon being connected to an analog telephone line and is capable of sending and receiving color images.

As shown in FIG. 1, the facsimile machine includes a CPU 101 for controlling the overall apparatus; a ROM 102 for storing programs such as the control program of the facsimile machine; a RAM 103 constituted by an SRAM or the like and used as a working memory for storing the program control variables of the facsimile machine and set values registered by the operator; an image memory 104 constituted by a DRAM or the like for storing image data; an image processor 105 for subjecting read image data to edge enhancement, a luminance/density conversion and a multilevel/bilevel conversion, etc; a control panel 106 for setting the mode and displaying the status of the facsimile machine; a recording controller 107 for converting the bilevel data to a native command for recording; a compression/expansion unit 108 for subjecting image data to compression/expansion in accordance with the JPEG or JBIG standard; a PC interface 109 for controlling an interface with a host computer 118, which is an external terminal; a bidirectional interface 110 for controlling the sending and receiving of data in two directions between the facsimile machine and the host computer 118; and a reading controller 111 for controlling the motor of a sheet scanner 112 when reading is performed.

The sheet scanner 112 is of the sheet-through type and is constituted by a CS/CCD image sensor, a reading motor, etc.

The facsimile machine further includes a line buffer 113 used when image data output from the image processor 105 is transferred to the image memory 104; a printer interface 114 for analyzing print description language and effecting a conversion to image data; a printer 115 for printing a read image, a received image and file data, etc., on printing paper; a communication controller 116 for performing mutual communication with another communication apparatus; and a timekeeping unit 117 for measuring operating intervals, etc. The host computer 118 configures the operation of the facsimile machine, monitors the status of the facsimile machine and manages image data read by and image data received by the facsimile machine. A public communication line 119 allows the facsimile machine to communicate with another communication apparatus.

Figure 2:
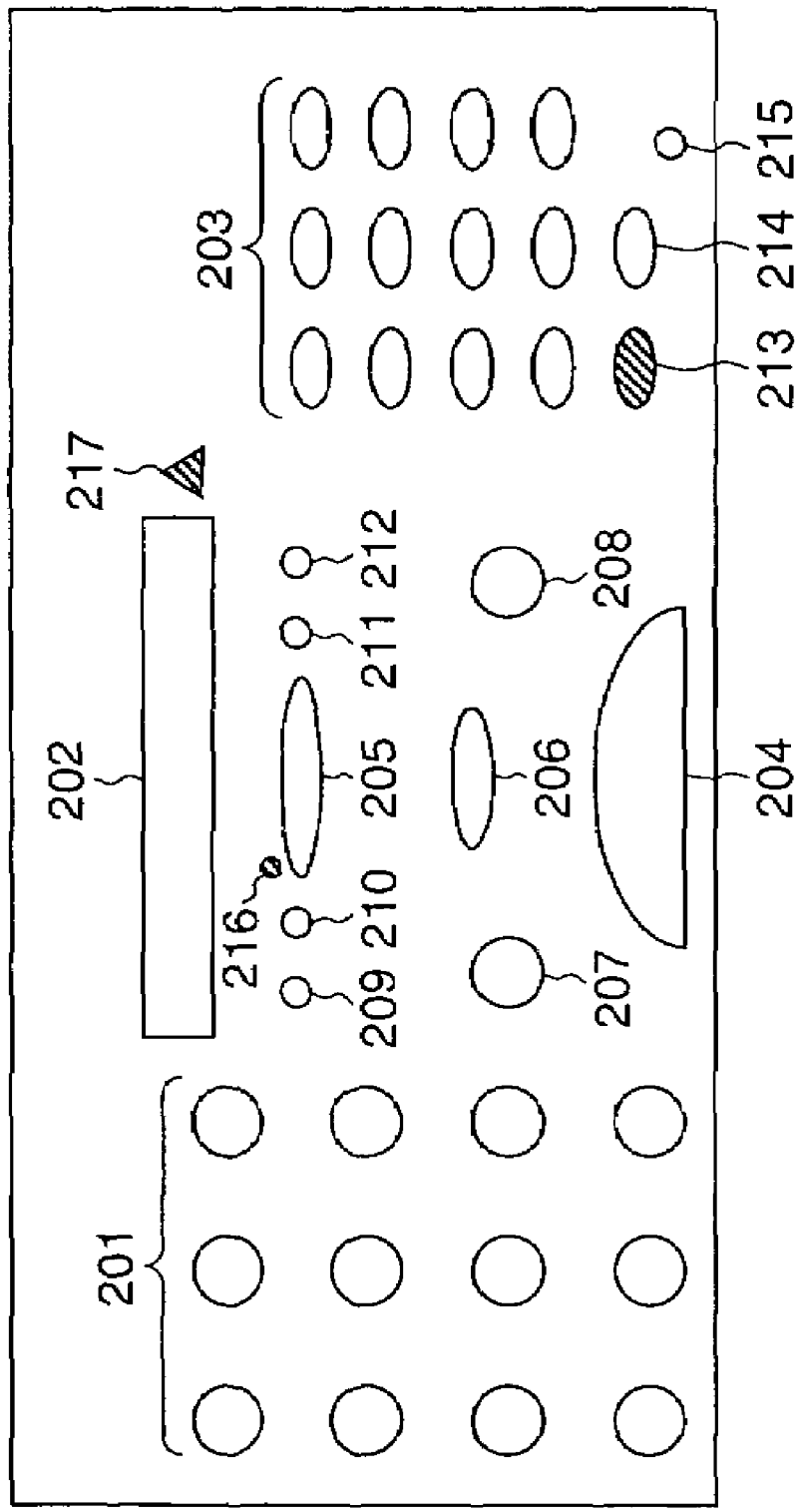
FIG. 2 is a diagram showing the construction of a control panel.

FIG. 2 illustrates the control panel 106 of this facsimile machine.

As shown in FIG. 2, the control panel 106 includes numeric keys 201 for entering a telephone number and for making various settings; a display unit 202 for displaying status information and operating state of the facsimile machine; single-touch keys 203 for entering a telephone number and for making various settings; a start key 204 for starting copying, communication or scanning, etc; a color/monochrome changeover key 205 for switching between color reading and monochrome reading; a resolution key 206 for switching reading resolution; a hook key 207 for acquiring and releasing a line; a stop key 208 for halting various operations and cancelling registration; a redial/pause key 209 for redialing a telephone number or inserting a pause in dialing; an abbreviated dialing key 210 for dialing a registered telephone number through an abbreviated procedure; a receive-mode changeover key 211 for changing over the receive mode; a copy key 212 for changing the mode to the copy mode; a function key 213 for changing the mode to various set modes of the facsimile machine; a setting key 214 for finalizing various settings; a recovery key 215 for error recovery; a color/monochrome operation display lamp 216 which is lit (turns ON) if the current reading operation is for color and which is extinguished (turned OFF) if the current reading operation is for monochrome; and an error display lamp 217 which, if any component of the facsimile machine malfunctions, gives notification of this event.

The operation of the facsimile machine constructed as set forth above will be described below.

In order to clarify the characterizing features of the facsimile machine according to this embodiment, processing for transmitting image data according to the prior art will be described first.

Figure 3:
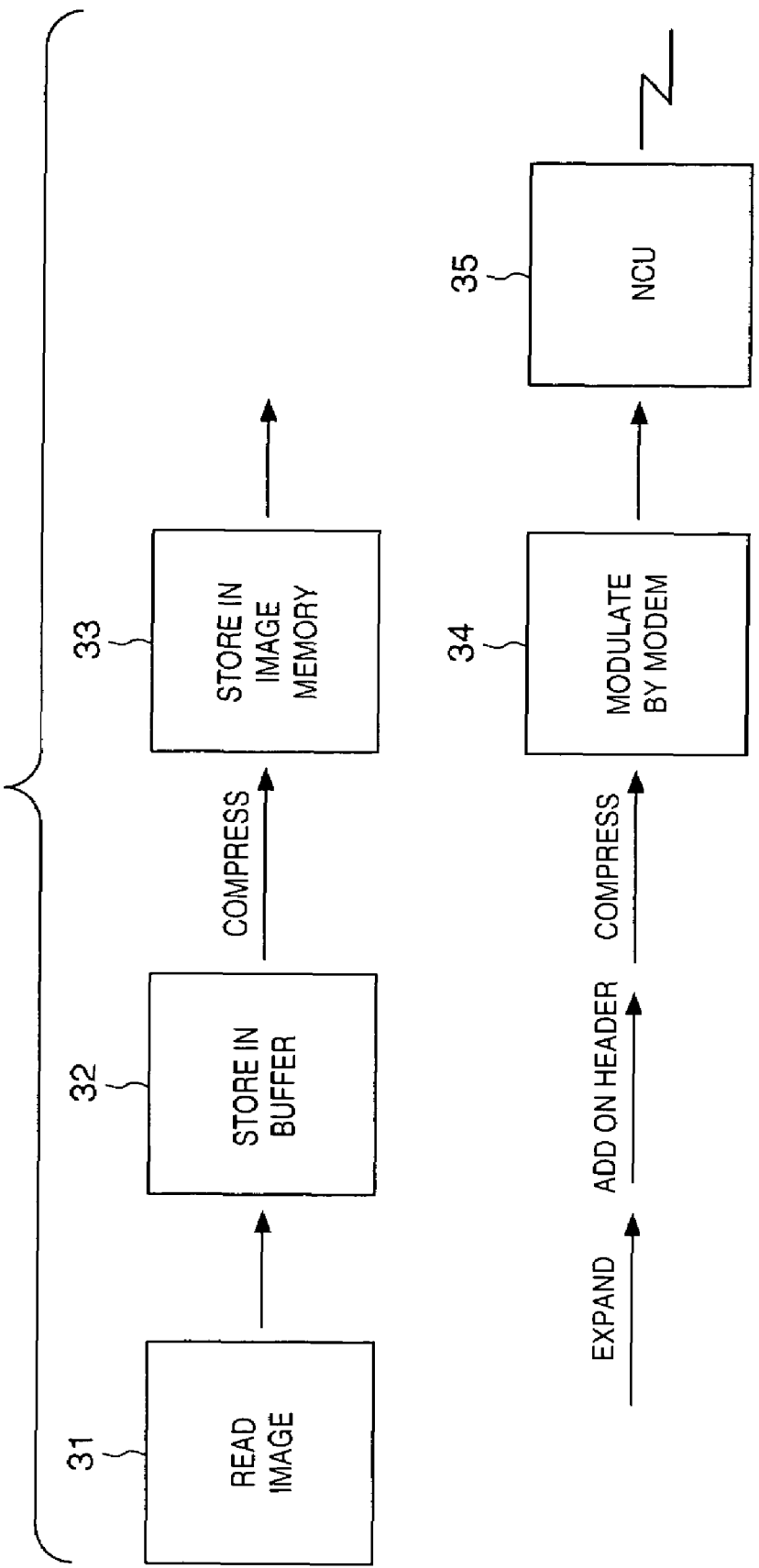
FIG. 3 is a block diagram illustrating processing for transmitting monochrome image data according to the prior art.

FIG. 3 is a block diagram useful in describing processing for transmitting monochrome image data according to the prior art, especially processing for adding on a header as transmission information.

First, an image is read by a scanner (31), analog signals that have been separated into black and white are converted to digital data of one bit per pixel, and then the digital data is stored successively in a buffer (32). The image data that has been stored in the buffer is output to an image memory (33) upon being compressed. Compression is required because outputting the raw data as is would require an extremely large memory.

Thereafter, the image data that has been stored in the image memory is expanded one line at a time in order to add on a header. After the header is added on, the image data is compressed again, subsequently modulated by a modem (34) and then transmitted to the line (35) from an NCU 35.

In accordance with this procedure, the transmission of image data is accompanied by expansion and then re-compression of the image data. As a consequence, processing time is prolonged.

Two forms of processing for transmitting image data by the facsimile machine according to this embodiment will be described next.

Figure 4:
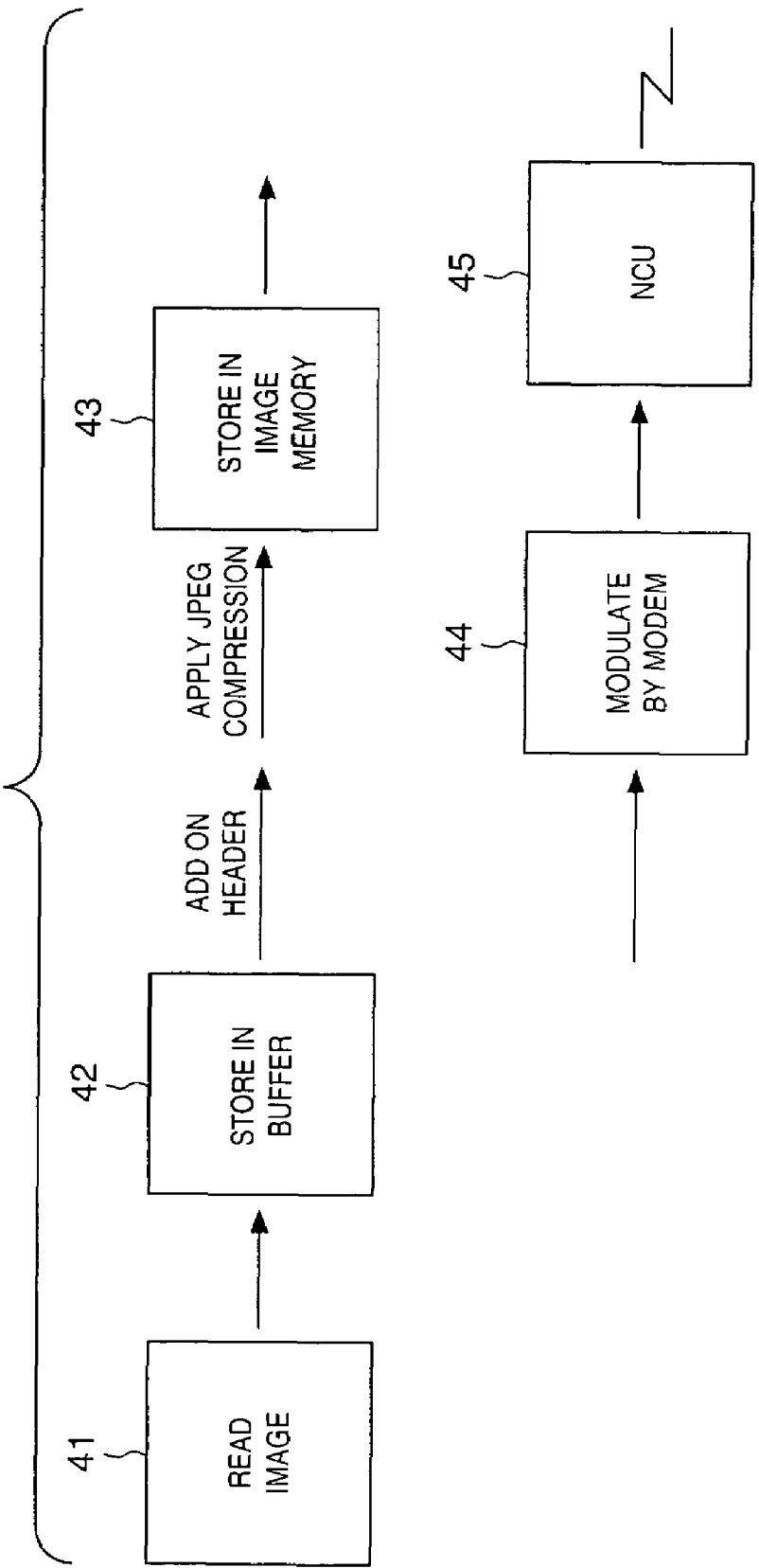
FIG. 4 is a block diagram useful in describing processing for transmitting image data by a first technique according to an embodiment of the present invention.

FIG. 4 is a block diagram useful in describing processing for transmitting image data according to a first technique, especially processing for adding a header to color image data as transmission information.

First, an image is read by the sheet scanner 112 (41) and digital image data that has been separated into the three primary colors R, G, B and consists of eight bits per color is stored successively in the line buffer 113 (42). Next, data representing a header that has been converted to eight bits per R, G, B is added onto the raw data that has been stored in the line buffer 113. The image data to which the header has been added is compressed as is (to the JPEG format) and then stored in the image memory 104 (43). Thereafter, without being expanded and then re-compressed, the image data that has been stored in the image memory 104 is transmitted to another facsimile machine or the like upon being modulated

(44) by a modem in the communication controller 116 and sent to the line (45) by the NCU.

This procedure will now be described in greater detail with reference to FIG. 5, which is a flowchart of processing according to the first technique for adding on a header when an image is read.

At step S501, date and time (e.g., the date and time at which reading by the sheet scanner 112 starts), page number (the number of pages from the first page) and the like are set in a header buffer (not shown) as transmission information that appears in a header stored in the RAM 103, etc.

This is followed by step S502, at which it is determined whether image data that has been stored in the line buffer 113 is the end of one page of data, i.e., whether data in excess of one MCU (Minimum Coded Unit) line has been stored in the line buffer 113. If one page of data has been completed ("YES" at step S502), control proceeds to step S507 and processing is exited. If one page of data has not been completed ("NO" at step S502), then control proceeds to step S503, at which data of one MCU line is extracted from the line buffer 113.

The number of lines referred to as "one MCU line" depends upon subsampling in JPEG compression processing.

For example, in a case where processing is executed at a subsampling ratio of 4:1:1, data of 16×16 pixels will be necessary. The smallest processing unit in terms of such JPEG processing is referred to as the MCU. Since a contact sensor or the like in a facsimile machine performs line-sequential scanning, in this embodiment JPEG processing is executed in units of MCU lines (16 lines in case of 4:1:1 subsampling), which is a state in which the MCUs are arranged one column wide.

Next, at step S504, it is determined whether the extracted MCU line is a line to which a header is to be added. In regard to an MCU line to which a header is not be added ("NO" at step S504), control proceeds to step S506, at which the data is subjected to JPEG decompression as is and then stored in the image memory 104. In regard to an MCU line to which a header is to be added ("YES" at step S504), control proceeds to step S505, at which processing for adding on a header is executed.

A specific example of the method used at step S505 involves first referring to a character code set in the header buffer by the processing of step S501 and then expanding the code by CG expansion executed in a CG expansion unit. This data is converted to data consisting of eight bits per each of the R, G, B color components, which is written over the data of one MCU line extracted from the line buffer 113. This is followed by subjecting this one MCU line to JPEG compression (step S506) and storing the compressed image data in the image memory 104.

The image data that has been stored in the image memory 104 is subsequently transmitted without being expanded and re-compressed.

Thus, in accordance with the first technique of this embodiment, when a color image is transmitted, JPEG compression is applied after the header is added on at reading of the data, the compressed data is stored in the image memory and then is transmitted as is. As a result, conservation of the image memory is achieved and processing at transmission time required heretofore, namely expansion followed by re-compression, is eliminated. This makes it possible to shorten transmission time.

Processing for transmitting image data according to a second technique of this embodiment will now be described.

Figure 6:
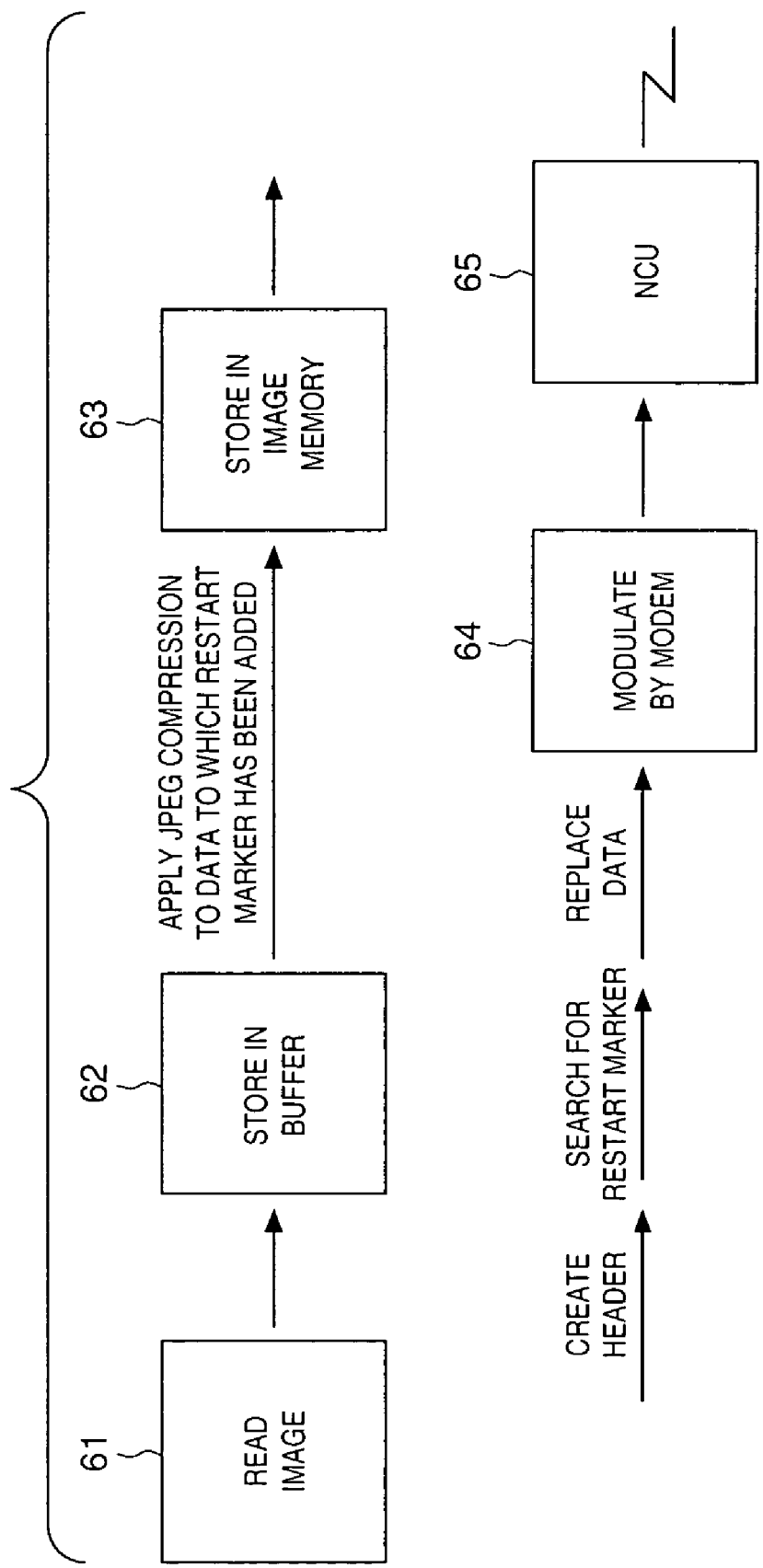
FIG. 6 is a block diagram useful in describing processing for transmitting image data by a second technique according to an embodiment of the present invention.

FIG. 6 is a block diagram useful in describing processing for adding a header to color image data as transmission information.

First, an image is read by the sheet scanner 112 (61) and digital image data that has been separated into the three primary colors R, G, B and consists of eight bits per color is stored successively in the line buffer 113 (62). When the stored raw data is subjected to JPEG compression and then stored in the image memory 104 (63), compression processing is executed. This processing involves adding a marker referred to as a "restart marker" to the end of one MCU line. A restart marker primarily is used in order to minimize the influence of invalid data such as communication data error. Sensing the end of one MCU line in a JPEG compression code is difficult. The purpose of this compression processing is to solve this problem by using the restart marker.

With regard to the transmission of image data, first raw data representing a header is generated. Next, image data is extracted from the image memory 104, the restart marker added on previously is searched for and, on the basis of the position of this marker, the image data of the MCU line to which the header is to be added is discarded. The raw data of the header created previously is subjected to JPEG compression in a format identical with that of the already compressed image data upon referring to the JPEG header portion (the portion describing the image compression conditions and the like) that has been added onto the already compressed image data (the JPEG header portion having been stored in the image memory 104). By inserting this JPEG-decompressed data in the portion discarded earlier, the inclusion of the header is realized.

Thereafter, without being expanded and then re-compressed, the image data is transmitted to another facsimile machine or the like upon being modulated (64) by a modem in the communication controller 116 and sent to the line (65) by the NCU.

Figure 7:
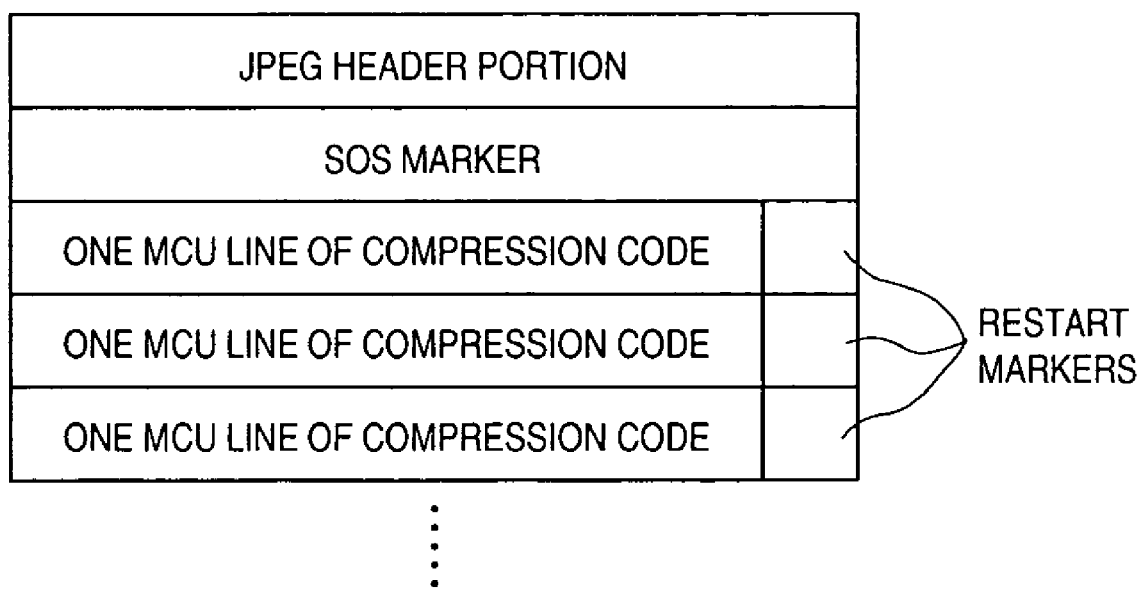
FIG. 7 is a diagram useful in describing the data structure of JPEG baseline-encoded data according to the second technique.

FIG. 7 is a diagram illustrating the data structure when a header is added on in accordance with the second technique shown in FIG. 6. One page of JPEG baseline-encoded data stipulated by Recommendation T.81 of ITU-TT4 is composed of an image frame between SOI (Start of Image) and EOI (End of Image) markers. The image frame is divided into a so-called JPEG header portion such as APP1, DQT, DHT, etc., and a JPEG compressed-data portion that begins with the SOS marker. As shown in FIG. 7, restart markers are inserted following the one-MCU line compression codes. When data is transmitted, one MCU line is sensed using these markers as guides and the JPEG compression codes of the header are substituted, as set forth earlier.

FIG. 8 is a flowchart of processing according to the second technique for adding on a header when an image is transmitted.

At step S801, date and time, page number and the like constituting transmission information to appear in the header stored in the RAM 103 or the like are set in a header buffer (not shown).

Next, at step. S802, a transmission-information header which is raw image data of eight bits per each of the color components R, G, B is created by a method similar to that of step S505 shown in FIG. 5.

This is followed by step S803, at which a restart marker is found among the JPEG compression codes of image data, to which start markers were added through the technique described above, and which has been stored in the image memory 104. An MCU line to which a header is to be added is detected based upon the marker at step S804.

The data constituting the header created at step S802 is subjected to JPEG compression (step S805), in accordance with a format similar to that of the data that has been stored in the image memory, upon referring to the JPEG header portion in the data structure of FIG. 7, and this is substituted (step S806) for the MCU line detected at step S804.

This image data is subsequently transmitted without being expanded and re-compressed.

Thus, in accordance with the second technique of this embodiment, when image data is compressed, a marker is added on and the image data is stored in an image memory. When this image data is transmitted, the marker is found and a header is added on as transmission information. As a result, conservation of the image memory is achieved and processing at transmission time required heretofore, namely expansion followed by re-compression, is eliminated. This makes it possible to shorten transmission time.

Furthermore, since the header is added on at the time of image data transmission in a manner similar to that of the prior art, accurate information such as communication starting time and total number of pages can be set forth in the header.

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment, and the storage medium storing the program codes constitutes the invention.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Figure 5:
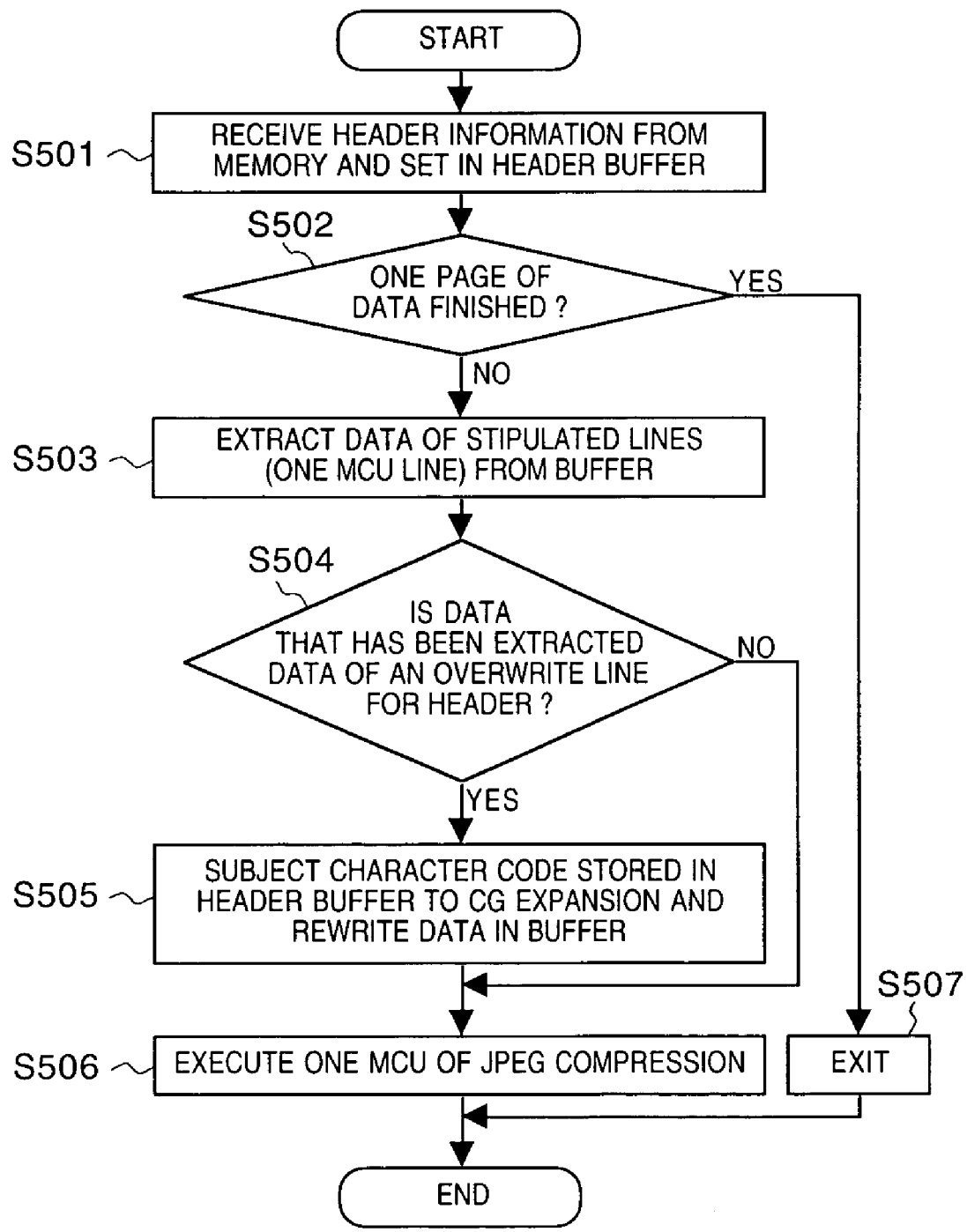
FIG. 5 is a flowchart of processing according to the first technique.

In a case where the present invention is applied to a storage medium, program code corresponding to the flowchart of FIG. 5 or FIG. 8 described earlier would be stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A color facsimile apparatus comprising:
a reading unit constructed to read an image;
a generating unit constructed to generate line image data representing at least part of the image;
a line buffering unit constructed to buffer at least a portion of the line image data;
a header buffer unit constructed to buffer a character code set;
an expansion unit constructed to expand the character code set into an expanded character code set;
a conversion unit constructed to convert the expanded character code set to a converted character code set equivalent to a number of lines of a minimum coded unit for JPEG compression processing, the converted character code set including transmission information for at least one of a page header and a page footer;
an extracting unit constructed to sequentially extract, from the line buffer unit, an amount of the line image data equivalent to the number of lines of the minimum coded unit for JPEG compression processing;
an exchanging unit constructed to exchange the number of lines of the minimum coded unit for JPEG compression from the line image data extracted by said extracting unit with the transmission information when the lines of the extracted image data correspond to at least one of a header portion in the image and a footer portion in the image;
a compressing unit constructed to sequentially execute JPEG compression processing for each minimum coded unit of the extracted image data including the transmission information;
a storing unit constructed to store compressed data output by said compressing unit in a memory; and
a transmitting unit constructed to transmit a JPEG image data based on the compressed data stored in the memory.

2. A color facsimile apparatus according to claim 1, further comprising a determining unit constructed to determine whether the amount of the line image data of the extracted image data is the amount of the line image data of the extracted image data corresponding to a header portion or footer portion in the image, and
wherein said exchanging unit exchanges the number of lines of minimum coded unit for JPEG compression with the transmission information according to a determination of said determining unit.

3. A color facsimile apparatus according to claim 1, wherein the transmission information indicates at least one of a date, a time, and a number of pages.

4. A controlling method of a color facsimile apparatus comprising the steps of:
using a computer to perform the following:
reading an image;
generating line image data representing at least part of the image;
buffering at least a portion of the line image data;
buffering a character code set;
expanding the character code set into an expanded character code set;
converting the expanded character code set to a converted character code set equivalent to a number of lines of a minimum coded unit for JPEG compression processing, the converted character code set including transmission information for at least one of a page header and a page footer;
sequentially extracting, from buffered line image data, an amount of the line image data equivalent to the number of lines of the minimum coded unit for JPEG compression processing;
exchanging the number of lines of minimum coded unit for JPEG compression from the line image data extracted in said extracting step with the transmission information when the lines of the extracted image data correspond to at least one of a header portion in the image and a footer portion in the image;

sequentially executing JPEG compression processing for each minimum coded unit of the extracted image data including the transmission information;

storing compressed data in a memory; and transmitting a JPEG image data based on the compressed data stored in the memory.

5. A storage medium storing a program for causing a computer to function as the following unit in a color facsimile apparatus:

a reading unit for reading an image;

a generating unit for generating line image data representing at least part of the image;

a line buffering unit for buffering at least a portion of the line image data;

a header buffer unit for buffering a character code set;

an expansion unit for expanding the character code set into an expanded character code set;

a conversion unit for converting the expanded character code set to a converted character code set equivalent to a number of lines of a minimum coded unit for JPEG compression processing, the converted character code set including transmission information for at least one of a page header and a page footer;

an extracting unit for sequentially extracting, from the line buffering unit, an amount of the line image data equivalent to the number of lines of the minimum coded unit for JPEG compression processing;

an exchanging unit for exchanging the number of lines of minimum coded unit for JPEG compression from the line image data extracted by said extracting unit with the transmission information when the lines of the extracted image data correspond to at least one of a header portion in the image and a footer portion in the image;

a compressing unit for sequentially executing JPEG compression processing for each minimum coded unit of the extracted image data including the transmission information;

a storing unit for storing compressed data by said compressing unit in a memory; and a transmitting unit for transmitting a JPEG image data based on the compressed data stored in the memory.

* * * * *